United States Patent [19]

Kushida et al.

[11] Patent Number: 4,657,974

[45] Date of Patent: Apr. 14, 1987

[54] FLAME-RETARDANT RESIN COMPOSITION

[75] Inventors: Yuichiro Kushida; Shigenobu Tago, both of Shibukawa; Tatsuhiro Aoyagi, Ichihara, all of Japan

[73] Assignee: Denki Kagaku Kogyo Kabushiki Kaisha, Tokyo, Japan

[21] Appl. No.: 782,569

[22] Filed: Oct. 1, 1985

[30] Foreign Application Priority Data

Oct. 19, 1984 [JP] Japan .............................. 59-218514
Aug. 15, 1985 [JP] Japan .............................. 60-178587

[51] Int. Cl.$^4$ .................. C08L 55/02; C08L 51/04; C08L 25/12; C08L 27/06
[52] U.S. Cl. .................................. 525/73; 525/76; 525/78; 525/85; 525/86; 525/239
[58] Field of Search ............... 525/86, 239, 73, 76, 525/78, 85

[56] References Cited

U.S. PATENT DOCUMENTS 3,053,800  9/1962  Grabowski et al. ............... 525/86
3,644,577  2/1972  Lee et al. ........................... 525/71

*Primary Examiner*—Carman J. Seccuro

*Attorney, Agent, or Firm*—Oblon, Fisher, Spivak, McClelland & Maier

[57] ABSTRACT

A flame-retardant resin composition comprising:

(a) a copolymer obtained by copolymerizing from 65 to 80% by weight of α-methylstyrene, from 15 to 30% by weight of acrylonitrile and from 0 to 30% by weight of a monomer copolymerizable therewith and having a number average molecular weight of from 15,000 to 80,000;

(b) a graft copolymer obtained by copolymerizing from 20 to 70 parts by weight of a monomer mixture of from 50 to 80% by weight of styrene, from 15 to 35% by weight of acrylonitrile and from 0 to 30% by weight of other vinyl compound copolymerizable therewith in the presence of from 30 to 80 parts by weight of a rubber having a glass transition temperature of not higher than 0° C.; and (c) a vinyl chloride resin; wherein the total amount of components (a) and (b) is from 10 to 80 parts by weight while the amount of component (c) is from 20 to 90 parts by weight, and the proportion of component (a) is from 30 to 90% by weight relative to the proportion of component (b) being from 10 to 70% by weight.

9 Claims, No Drawings

FLAME-RETARDANT RESIN COMPOSITION

The present invention relates to a flame-retardant resin composition comprising ABS and a vinyl chloride resin as the major components and having excellent heat resistance and flow properties.

A resin composition of ABS flame-retarded by an addition of a vinyl chloride resin is referred to as a blend-type flame-retardant ABS, and used for food containers or housings for various audio equipments or automated office appliances.

However, the conventional ABS/vinyl chloride resin compositions have relatively low heat resistance, and molded products thereof are likely to undergo a thermal deformation when the heat generation of the electric system accommodated therein is relatively high and the temperature of the housing rises, or when the temperature of the storage place for shipping rises. Therefore, they have not been used very much, and their improvement has been desired. Particularly for housings for audio equipments and automated office appliances, molded products are generally of a large size, and accordingly, A resin composition having particularly good flow properties has been desired to obtain a molded product having a precise shape and which is free from a distortion when left to stand still.

In order to improve the heat resistance, there have been some proposals in e.g. Japanese Examined Patent Publications No. 24867/1970 and 18101/1973 wherein α-methylstyrene is introduced. However, in each case, no adequate effect for the improvement of the heat resistance has been obtained, and the flow properties have been inadequate, whereby the practical application of such proposals has been limited.

Under the circumstances, it is an object of the present invention to provide a flame-retardant resin composition comprising an ABS resin and a vinyl chloride resin as the major components and having excellent heat resistance and flow properties. In general, the heat resistance can be increased by increasing the proportion of the monomer component responsible for the heat resistance in the copolymer. Namely, in this particular case, the heat resistance can effectively be increased by increasing the proportion of α-methylstyrene. However, it is also common that with an increase of the heat resistance, the flow properties tend to deteriorate, and it is difficult to improve the heat resistance and the flow properties simultaneously.

Especially in a composite system with polyvinyl chloride as in the present invention, it is necessary to conduct the blending and molding at a temperature lower than the pyrolytic temperature of polyvinyl chloride, i.e. lower than about 200° C., and a high level of flow properties is required so that the flowability is adequate even at such a low molding temperature to produce a large size molded product by injection molding.

The present inventors have conducted extensive researches to solve this problem of simultaneously satisfying the heat resistance and the high level of flow properties, and have found it possible to obtain excellent flow properties without a substantial sacrifice of the heat resistance by adjusting the number average molecular weight ($\overline{M}_n$) of a copolymer composed mainly of α-methylstyrene and acrylonitrile to a level of from 15,000 to 80,000, which roughly corresponds to a number average chain length ($\overline{A}_n$) of from 375 to 2000 Å.

Namely, the present invention provides a flame-retardant resin composition comprising:

(a) a copolymer obtained by copolymerizing from 65 to 80% by weight of α-methylstyrene, from 15 to 30% by weight of acrylonitrile and from 0 to 30% by weight of a monomer copolymerizable therewith and having a number average molecular weight of from 15,000 to 80,000;

(b) a graft copolymer obtained by copolymerizing from 20 to 70 parts by weight of a monomer mixture of from 50 to 80% by weight of styrene, from 15 to 35% by weight of acrylonitrile and from 0 to 30% by weight of other vinyl compound copolymerizable therewith in the presence of from 30 to 80 parts by weight of a rubber having a glass transition temperature of not higher than 0° C.; and (c) a vinyl chloride resin; wherein the total amount of components (a) and (b) is from 10 to 80 parts by weight while the amount of component (c) is from 20 a temporarily distorted lens in which the two outside lens body segments 14 and 18 are folded to overlap the center segment 16. Fold lines 26 are formed on the frame member and directly overlie the interfacing edges 28 of abutting segments As shown in FIG. 1, frame member 12 is provided with four fold lines on each outwardly exposed frame member surface, both anterior and posterior, and these fold lines directly overlie the two interfaces,of the three abutting lens segments. Thus, when the lens bor average chain length ($\overline{M}_n$) based on polystyrene within a range of from 375 to 2000 Å. If the number average molecular weight is less than 15,000 or the number average chain length is less than 375 Å, the impact resistance and the heat resistance tend to be poor although the flow properties and the moldability will be good. On the other hand, if the number average molecular weight exceeds 80,000, or the number average chain length exceeds 2000 Å, the moldability will be poor, and the residual strain in the molded product will be substantial, such being undesirable.

Further, the copolymer of component (a) preferably has a ratio of $\overline{M}_w/\overline{M}_n$ within a range of from 1.5 to 3.5, where $\overline{M}_w$ is the weight average molecular weight of the copolymer and $\overline{M}_n$ is the number average molecular weight of the copolymer. This preferred $\overline{M}_w/\overline{M}_n$ ratio roughly corresponds to a ratio of $\overline{A}_w/\overline{A}_n$ within a range of from 1.5 to 3.5, where $\overline{A}_w$ is the weight average chain length of the copolymer and $\overline{A}_n$ is the number average chain length of the copolymer.

As a process for the production of the copolymer of component (a), there may be employed suspension polymerization in which the polymerization is conducted in an aqueous medium by using a so-called suspension stabilizer, or emulsion polymerization in which the monomers are emulsified by an emulsion stabilizer, followed by the polymerization. The suspension polymerization is preferred.

As the copolymerizable monomer in component (a), there may be mentioned, for instance, a halogen-substituted styrene, vinyl toluene, t-butylstyrene, methacrylonitrile, maleimide, an N-substituted maleimide, methacrylic acid or a methacrylic acid ester.

As the other copolymerizable vinyl compound used for the preparation of the graft copolymer of component (b), there may be mentioned methacrylonitrile, a methacrylic acid ester, an acrylic acid ester or an N-substituted maleimide.

As the rubber having a glass transition temperature (Tg) of not higher than 0° C., there may be mentioned a homopolymer of a conjugated diene such as butadiene or isoprene or a copolymer thereof with a copolymerizable vinyl monomer, or an acrylic acid ester copolymer. Particularly preferred is polybutadiene or a copolymer containing at least 50% by weight of butadiene. The graft polymerization can be conducted by an ordinary method under conventional polymerization conditions.

The vinyl chloride resin of component (c) is polyvinyl chloride or a resin obtained by copolymerizing at least 50% of vinyl chloride with a mono-olefinic monomer. As the mono-olefinic monomer, there may be mentioned, for instance, vinyl acetate, vinyl stearate, an acrylic acid ester, a methacrylic acid ester, styrene, acrylonitrile, or an α-olefin such as ethylene or propylene, or the like.

The vinyl chloride resin preferably has a polymerization degree of not higher than 700. If the polymerization degree exceeds 700, the flow properties tend to be poor.

In the present invention, the mixing proportions of components (a) and (b) are from 30 to 90% by weight and from 10 to 70% by weight, respectively. If the component (a) is less than 30% by weight, no substantial effect for the improvement of the heat resistance will be obtained.

The total amount of components (a) and (b) is from 10 to 80% by weight, while the amount of component (c) is from 20 to 90% by weight. If the total amount of components (a) and (b) is less than 10%, no substantial effect is obtainable for the improvement of the heat resistance of the vinyl chloride resin composition. On the other hand, if the total amount exceeds 80% by weight, the desired properties of the vinyl chloride resin will be lost, and the elongation till the breakage will be low. Further, additives such as stabilizers, processing assistants or pigments may be incorporated into component (a), component (b) and component (c), as the case requires.

The mixing of components (a), (b) and (c) can readily be conducted by conventional methods with use of a Bumbury's mixer, a mixing roll or an extruder.

Now, the present invention will be described in further detail with reference to Examples. However, it should be understood that the present invention is by no means restricted to these specific Examples.

In this specification, "parts" and "%" indicate "parts by weight" and "% by weight".

EXAMPLES 1 to 5 and COMPARATIVE EXAMPLES 1 to 5

Preparation of the copolymer of component (a)

Into a 5 liter autoclave equipped with a stirrer, 2 kg of pure water and 20 g of calcium tertiary phosphate were charged, and thoroughly stirred while supplying nitrogen gas. Then, 1.4 kg of α-methylstyrene, 0.6 kg of acrylonitrile and 0.2 g of potassium persulfate were added together with 40 g of di-tertiary-butyl peroxyhydrophthalate as the initiator, and then the atmosphere of the system was replaced by nitrogen gas.

The autoclave was heated to heat the mixture to a temperature of 95° C., and the polymerization reaction was conducted for 15 hours at that temperature to complete the polymerization. The slurry thereby obtained was neutralized with 15% hydrochloric acid, then subjected to water removal and dried at 80° C. to obtain a granular polymer. The number average molecular weight of the copolymer thus obtained was 30,000.

Preparation of the graft copolymer of component (b)

Into a polymerization reactor, 286 parts of polybutadiene latex (polybutadiene solid concentration: 35%, average particle size: 350 mμm, gel content: 87%), 400 parts of water, 2 parts of a potassium salt of fatty acid, 0.006 part of ferrous sulfate, 0.015 part of tetrasodium ethylenediamine tetraacetate and 0.3 part of formaldehyde sodium sulfoxylate were charged. While stirring the mixture at a temperature of 50° C., 150 parts of a monomer mixture comprising 45 parts of acrylonitrile and 105 parts of styrene in which 0.8 part of t-dodecylmercaptan and 0.3 part of dicumylperoxide were dissolved, was added over a period of 3 hours. After the completion of the addition, the temperature was raised to 65° C., and the polymerization was continued for further 1 hour. The emulsified polymer solution thus obtained was flocculated by calcium chloride, then washed, subjected to water removal and dried to obtain a white powdery copolymer.

60 parts of component (a) and 40 parts of component (b) were mixed and pelletized. The pellets (hereinafter referred to simply as "heat resistance-imparting agent"), a vinyl chloride resin, a stabilizer, etc. were blended, and again pelletized.

The additives other than components (a), (b) and (c) were as follows:

| | |
|---|---|
| Octyl Sn maleate (TM-188J, manufactured by Katsuta Kako) | 1.5 parts |
| Composite lubricant (GH-4, manufactured by Henschel Co.) | 1.0 part |
| Lubricant (OP-Wax, manufactured by Hoechst Co.) | 0.2 part |

Blending and molding method

Into a 75 liter Henschel mixer, vinyl chloride, the heat resistance-imparting agent, GH-4 and OP-Wax were successively added in the above proportions, and the mixture was heated to 75° C. under stirring. Then TM-188J was added at 75° C., and then the mixture was heated to 120° C. and then cooled. The blend thereby obtained was withdrawn and pelletized by a 40 mm extruder.

A part thereof was kneaded by 8 inch rolls at a temperature of 160° C. for 5 minutes and then formed into a sheet.

Further, this sheet was pressed to obtain pressed sheets having various thickness. The pressed sheets were cut into a shape according to ASTM or JIS, and their various physical properties were evaluated and shown in Table 1

TABLE 1

| | Comparative Example 1 | Comparative Example 2 | Example 1 | Example 2 | Example 3 | Example 4 | Comparative Example 3 | Comparative Example 4 | Comparative Example 5 | Example 5 |
|---|---|---|---|---|---|---|---|---|---|---|
| Composition of heat resistance-imparting agent | | | | | | | | | | |
| Component (a) (%) | — | 60 | 60 | 60 | 60 | 60 | 60 | 60 | 60 | 35 |
| Component (b) (%) | — | 40 | 40 | 40 | 40 | 40 | 40 | 40 | 40 | 65 |

TABLE 1-continued

| | Comparative Example 1 | Comparative Example 2 | Example 1 | Example 2 | Example 3 | Example 4 | Comparative Example 3 | Comparative Example 4 | Comparative Example 5 | Example 5 |
|---|---|---|---|---|---|---|---|---|---|---|
| Amount of heat resistance-imparting agent (parts) | 0 | 5 | 40 | 40 | 40 | 40 | 40 | 40 | 40 | 40 |
| Amount of vinyl chloride resin (parts) | 100 | 95 | 60 | 60 | 60 | 60 | 60 | 60 | 60 | 60 |
| Polymerization degree of vinyl chloride resin | 600 | 600 | 600 | 600 | 600 | 600 | 600 | 800 | 600 | 600 |
| Component (a) | | | | | | | | | | |
| Copolymer composition An / α-MST | 30/70 | 30/70 | 30/70 | 30/70 | 30/70 | 30/70 | 30/70 | 30/70 | 50/50 | 30/70 |
| Nunber average molecular weight | 30000 | 30000 | 30000 | 15000 | 50000 | 80000 | 100000 | 30000 | 30000 | 30000 |
| Vicat softening temp. (°C.) | 72 X | 74 X | 82 O | 80 O | 84 O | 85 O | 87 O | 83 O | 76 X | 78 O |
| Izod impact strength kg · cm/cm | 5 X | 5 X | 25 O | 20 O | 27 O | 27 O | 30 O | 28 O | 28 O | 50 O |
| Spiral flow (cm) | 29 O | 29 O | 33 O | 35 O | 31 O | 30 O | 27 Δ | 25 X | 31 O | 29 O |
| Large size injection moldability | O | O | ⊚ | ⊚ | ⊚ | O | X | X | O | O |
| Overall evaluation | No good | No good | Good | Good | Good | Good | No good | No good | No good | Good |

The testing methods in Table 1 and the evaluation standards are as follows.

(1) For the evaluation of the physical properties, ⊚ indicates "excellent", O indicates "good", Δ indicates "slightly inferior", and X indicates "no good".
(2) Vicat softening temperature: JIS K6740
(3) Izod impact strength: ASTM 6740
(4) The spiral flow was measured as follows.

By using a semicircular mold having a mold cross sectional diameter of 4.5 mm and a height of 2 mm, the resin was injected under an injection pressure of 70 kg/cm² at a cylinder temperature of 180° C., whereby the flow length (cm) of the resin was measured.

(5) The large size injection moldability was measured under the following conditions. By using a 330 ton injection molding machine (KS-330, manufactured by Kawaguchi Tekko), a 10 inch printer frame was molded at a cylinder temperature of from 160° to 180° C. under a primary pressure of 130 kg/cm², whereby the evaluation was made as to (1) whether the resin is filled fully to the fine terminal portions, and (2) whether a strain remains after the molding.
⊚ indicates "excellent".
O indicates "good".
χ indicates "poor moldability".

EXAMPLES 6 to 9 and COMPARATIVE EXAMPLES 6 to 9

Preparation of the copolymer of component (a)

Copolymers A to F were prepared in the same manner as in Examples 1 to 5 except that the initiator and polymerization temperature were as identified in Table 2. $\overline{M}_n$, $\overline{M}_w/\overline{M}_n$, $\overline{A}_n$ and $\overline{A}_w/\overline{A}_n$ of copolymers A to F are also shown in Table 2.

TABLE 2

| Copolymer | Initiator Type* | Initiator Amount (wt. %/monomers) | Polymerization temp. (°C.) | Component (a) $\overline{M}_n$ ($A_n$) | Component (a) $\overline{M}_w/\overline{M}_n$ ($A_w/A_n$) |
|---|---|---|---|---|---|
| A | a | 0.75 | 97 | 44800 (1120Å) | 2.3 (2.3) |
| B | b | 0.79 | 85 | 46800 (1170Å) | 2.4 (2.4) |
| C | a | 0.28 | 107 | 43200 (1080Å) | 2.5 (2.5) |
| D | a | 2.44 | 97 | 30800 (770Å) | 2.6 (2.6) |
| E | a | 0.16 | 97 | 66000 (1650Å) | 2.5 (2.5) |
| F | c | 0.06 | 70 | 46400 (1160Å) | 2.3 (2.3) |

*a: 1,1-Di-t-butyl peroxy-3,3,5-trimethylcyclohexane
b: Di-t-butyl peroxy hexahydroterephthalate
c: Potassium persulfate The preparation of the graft copolymer of component (b) and the blending and molding, were conducted in the same manner as in Examples 1 to 5. The molded products were evaluated in the same manner as Examples 1 to 5, and the results are shown in Table 3.

TABLE 3

| | Comparative Example 6 | Comparative Example 7 | Example 6 | Example 7 | Example 8 | Example 9 |
|---|---|---|---|---|---|---|
| Composition of heat resistance-imparting agent | | | | | | |
| Component (a) (%) | — | 60 | 60 | 60 | 60 | 60 |
| Component (b) (%) | — | 40 | 40 | 40 | 40 | 40 |
| Amount of heat resistance-imparting agent (parts) | 0 | 5 | 40 | 40 | 40 | 40 |
| Amount of vinyl chloride resin (parts) | 100 | 95 | 60 | 60 | 60 | 60 |
| Component (a): Copolymer | — | A | A | B | C | F |
| $\overline{M}_N$ ($A_N$) | — | 44800 (1120Å) | 44800 (1120Å) | 46800 (1170Å) | 43200 (1080Å) | 46400 (1160Å) |
| $\overline{M}_w/\overline{M}_n$ ($A_w/A_n$) | — | 2.3 (2.3) | 2.3 (2.3) | 2.4 (2.4) | 2.5 (2.5) | 2.3 (2.3) |
| Vicat softening temp. (°C.) | 75 X | 76 X | 85 O | 84 O | 86 O | 84 O |
| Izod impact strength (kg · cm/cm) | 2 X | 3 X | 20 O | 22 O | 20 O | 24 O |
| Spiral flow (cm) | 28 O | 26 O | 28 O | 29 O | 28 O | 28 O |
| Overall evaluation | No good | No good | Good | Good | Good | Good |

It is evident from Tables 1 and 3 that the molded products of the Examples of the present invention have high heat resistance and good flow properties.

What is claimed is:

1. A flame-retardant resin composition comprising:
   (a) a copolymer obtained by copolymerizing from 65 to 80% by weight of α-methylstyrene, from 15 to 30% by weight of acrylonitrile and from 0 to 30% by weight of a monomer copolymerizable therewith and having a number average molecular weight of from 15,000 to 80,000 and a ratio of $\overline{M}_w/\overline{M}_n$ within a range of from 1.5 to 3.5, where $\overline{M}_w$ is the weight average molecular weight of the copolymer and $\overline{M}_n$ is the number average molecular weight of the copolymer;
   (b) a graft copolymer obtained by copolymerizing from 20 to 70 parts by weight of a monomer mixture of from 50 to 80% by weight of styrene, from 15 to 35% by weight of acrylonitrile and from 0 to 30% by weight of other vinyl compound copolymerizable therewith in the presence of from 30 to 80 parts by weight of a rubber having a glass transition temperature of not higher than 0° C.; and
   (c) a vinyl chloride resin having a polymerization degree of not higher than 700; wherein the total amount of components (a) and (b) is from 10 to 80 parts by weight while the amount of component (c) is from 20 to 90 parts by weight, and the proportion of component (a) is from 30 to 90% by weight relative to the proportion of component (b) being from 10 to 70% by weight.

2. The flame-retardant resin composition according to claim 1, wherein the copolymer of component (a) is prepared by suspension polymerization.

3. The flame-retardant resin composition according to claim 1, wherein said copolymerizable monomer in component (a) is selected from the group consisting of a halogen-substituted styrene, vinyl toluene, t-butylstyrene, methacrylonitrile, maleimide, an N-substituted maleimide, methacrylic acid or a methacrylic acid ester.

4. The flame-retardant resin composition according to claim 1, wherein said other copolymerizable vinyl compound in component (b) is selected from the group consisting of methacrylonitrile, a methacrylic acid ester, an acrylic acid ester and an N-substituted maleimide.

5. The flame-retardant resin composition according to claim 1, wherein the rubber in component (b) is a homopolymer or copolymer of a conjugated diene, or an acrylic acid ester copolymer.

6. The flame-retardant resin composition according to claim 5, wherein the conjugated diene is butadiene or isoprene.

7. The flame-retardant resin composition according to claim 1, wherein the rubber in component (b) is polybutadiene or a butadiene copolymer containing at least 50% by weight of butadiene.

8. The flame-retardant resin composition according to claim 1, wherein the vinyl chloride resin of component (c) is polyvinyl chloride or a resin obtained by copolymerizing at least 50% of vinyl chloride with a mono-olefinic monomer.

9. The flame-retardant resin composition according to claim 8, wherein the mono-olefinic monomer is selected from group consisting of vinyl acetate, vinyl stearate, an acrylic acid ester, a methacrylic acid ester, styrene, acrylonitrile, ethylene or propylene.

* * * * *